(12) United States Patent
Raineri

(10) Patent No.: US 8,579,260 B2
(45) Date of Patent: Nov. 12, 2013

(54) WIRE GUIDING DEVICE

(76) Inventor: Dennis Raineri, Rixford, PA (US)

(*) Notice: Subject to any disclaimer, the term of this patent is extended or adjusted under 35 U.S.C. 154(b) by 536 days.

(21) Appl. No.: 12/573,599

(22) Filed: Oct. 5, 2009

(65) Prior Publication Data

US 2010/0084621 A1 Apr. 8, 2010

Related U.S. Application Data

(60) Provisional application No. 61/102,810, filed on Oct. 3, 2008.

(51) Int. Cl.
*B66D 3/04* (2006.01)

(52) U.S. Cl.
USPC .................................. 254/389; 254/134.3 R

(58) Field of Classification Search
USPC .............................. 254/134.5, 134.3 R, 389
See application file for complete search history.

(56) References Cited

U.S. PATENT DOCUMENTS

| | | | | |
|---|---|---|---|---|
| 1,147,792 A * | 7/1915 | Early | ...................... | 254/394 |
| 2,746,715 A * | 5/1956 | Sherrod | .................. | 254/134.3 R |
| 3,020,332 A * | 2/1962 | Appleton | ................ | 174/72 R |
| 3,944,184 A * | 3/1976 | Fisch | ...................... | 254/134.3 R |
| 4,541,615 A * | 9/1985 | King, Jr. | ................ | 254/134.3 FT |
| 4,796,865 A * | 1/1989 | Marchetti | ............. | 254/134.3 FT |
| 4,801,118 A * | 1/1989 | Wium | ...................... | 248/300 |
| 4,909,481 A * | 3/1990 | Tamm | ...................... | 254/134.3 R |
| 4,946,137 A * | 8/1990 | Adamczek | .......... | 254/134.3 FT |
| 4,951,923 A * | 8/1990 | Couture | ................. | 254/134.3 R |
| 5,029,817 A * | 7/1991 | Tamm | ...................... | 254/134.3 R |
| 5,236,177 A * | 8/1993 | Tamm | ...................... | 254/134.3 FT |
| 5,271,605 A * | 12/1993 | Damron | ................ | 254/134.3 FT |
| 6,302,379 B1 * | 10/2001 | Walters | ................ | 254/134.3 FT |
| 6,388,193 B2 * | 5/2002 | Maynard et al. | ..... | 174/59 |
| 6,452,096 B1 * | 9/2002 | Childers | ............... | 174/50 |
| 6,580,029 B1 * | 6/2003 | Bing | ...................... | 174/360 |
| 6,672,567 B1 * | 1/2004 | Chembars | ........... | 254/134.3 FT |
| 6,739,581 B1 * | 5/2004 | Carlson | ............... | 254/134.3 R |
| 6,838,615 B2 * | 1/2005 | Pyron | ..................... | 174/50 |
| 7,323,637 B2 * | 1/2008 | Tideback | ............. | 174/50 |
| 7,419,136 B2 * | 9/2008 | Martinez | ............. | 254/134.3 FT |
| 7,484,711 B2 * | 2/2009 | Pyron | ................... | 254/134.3 FT |
| 7,582,835 B2 * | 9/2009 | Pyron | ................... | 174/481 |
| 7,604,220 B1 * | 10/2009 | Tomlinson | .......... | 254/134.3 FT |
| 7,954,858 B2 * | 6/2011 | Pyron | ..................... | 285/55 |
| 2005/0104051 A1 * | 5/2005 | Neal | ...................... | 254/134 |
| 2005/0253124 A1 * | 11/2005 | Pyron | ................. | 254/134.3 FT |
| 2007/0044985 A1 * | 3/2007 | Tideback | ............. | 174/50 |
| 2008/0296543 A1 * | 12/2008 | Robson | ................ | 254/134.3 R |
| 2010/0084621 A1 * | 4/2010 | Raineri | ................ | 254/134.3 R |

* cited by examiner

*Primary Examiner* — Lee D Wilson
*Assistant Examiner* — Jamal Daniel
(74) *Attorney, Agent, or Firm* — Hodgson Russ LLP

(57) ABSTRACT

A wire guiding device for use with an electrical fitting such as an "LB" fitting is provided. The wire pulling device comprises a frame and two rollers mounted on axles. A first roller allows a wire to be pulled around the angle of the fitting and may be of sufficient diameter to prevent damage to the wire, while a second roller may prevent the wire from contacting the damaging edges of the fitting. The rollers are mounted within a frame which is adaptable to the access port of an LB fitting. Holes may be located in the frame such that fasteners engage the pre-existing threaded holes located in a standard LB fitting.

19 Claims, 4 Drawing Sheets

WIRE GUIDING DEVICE

CROSS-REFERENCE TO RELATED APPLICATION

This application claims the benefit of priority to U.S. provisional patent application Ser. No. 61/102,810, filed on Oct. 3, 2008, now pending, which application is hereby incorporated by reference.

FIELD OF THE INVENTION

The present invention relates to a guiding attachment for an angle fitting, such as an LB fitting, for use in pulling cable through conduit.

BACKGROUND OF THE INVENTION

Rigid conduit, made from metal or plastic, is commonly employed by electricians in commercial, industrial, and, occasionally, residential structures. Such conduit may be selected by the electrician for easy of use, flexibility in future expansion, or such conduit may be required by electrical codes.

The construction of rigid conduit has been standardized to enable components from different manufacturers to be utilized together and also so that standardized tools may be used in assembly and construction. Conduit includes pipes and fittings, as well as other components. Fittings may be used, for example, to connect lengths of pipes together, to allow access to internal wires after assembly, or to facilitate changes in direction of a wire run.

A 90 degree turn in the conduit may be accomplished by fittings such as, for example, an "LB" fitting—so named because of the "el" shape of the fitting and the location of the conduit exit point on the "back" of the fitting. However, the use of an LB fitting requires at least two electricians to pull wire through a length of conduit—a first electrician to pull the wire, and a second electrician to guide the wire around the sharp angle of the LB fitting. Even if the first electrician could apply enough pulling force to the wire, an unacceptable amount of damage would likely be done to the wire.

Previous devices have attempted to address the difficulties in wire pulling but have not been able to address both the need for two electricians and the need to avoid damage to wire. Some prior art devices provide guide rollers to prevent contact between the wire and the fitting edges. However, such devices still require a second electrician to guide the wire through the fitting. See U.S. Pat. Nos. 3,020,332 and 3,944,184.

Other prior art devices provide rollers or pulleys that are temporarily seated within the fitting to guide the wire through. Such devices may alleviate the need for a second electrician because the roller allows the wire to pass through the fitting without assistance. However, these prior art devices suffer from a small size of the roller used. Wire pulled through such a device may not be damaged by contact with the sharp edges of the fitting, but may still be damaged by the act of being pulled around a roller of insufficient radius. Such damage is readily apparent when the wire being pulled is an optical fiber cable in which one or more glass fibers within the cable must not be bent around a radius below a certain threshold. See, e.g., U.S. Pat. No. 4,909,481.

As exemplified by the aforementioned prior art devices, such device should be temporarily adapted to the conduit fitting so that when the wire has been pulled through, the device may be removed and a cover may be affixed to the fitting.

Accordingly, there is a need for a device which may be temporarily adapted to an conduit fitting, and which eliminates the need for a second electrician without causing an unacceptable amount of damage to the wire.

SUMMARY OF THE INVENTION

The present invention meets the above described need by providing a wire guiding device that uses two rollers in combination. A first roller allows a wire to be pulled around the angle of the fitting and may be of sufficient diameter to prevent damage to the wire, while a second roller may prevent the wire from contacting the damaging edges of the fitting. The rollers are mounted within a frame which is adaptable to the access port of an LB fitting. Holes may be located in the frame such that fasteners engage the pre-existing threaded holes located in a standard LB fitting. In this way, the device may be attached to the LB fitting and removed for use elsewhere. The rollers are affixed to the frame by way of removable axles such that the wire, being interlaced through the rollers during use, can be removed from the device after the wire pulling has been completed.

BRIEF DESCRIPTION OF THE FIGURES

The invention will be described further by way of non-limiting examples, with reference to the attached drawings and diagrams in which:

FIG. 1b is an end view of the device of FIG. 1a;

FIG. 1c is a side view of the device of FIGS. 1a and 1b;

FURTHER DETAILS OF THE INVENTION

Figure 1A:
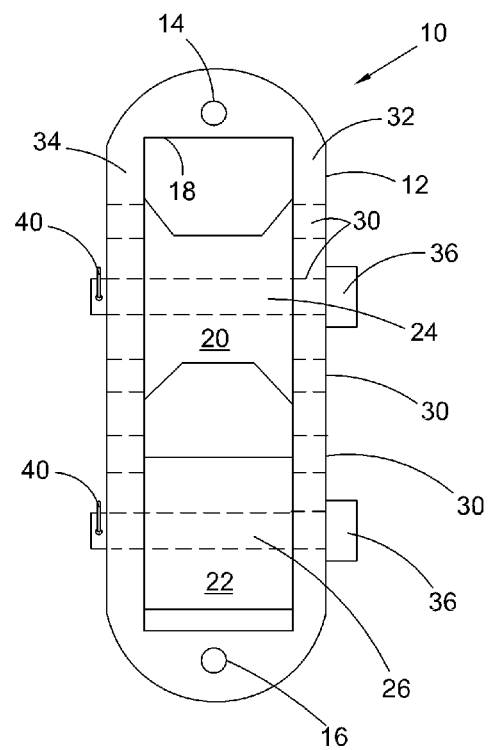
FIG. 1a is top view of a device according to an embodiment of the invention.
Figures 1B, 1C:
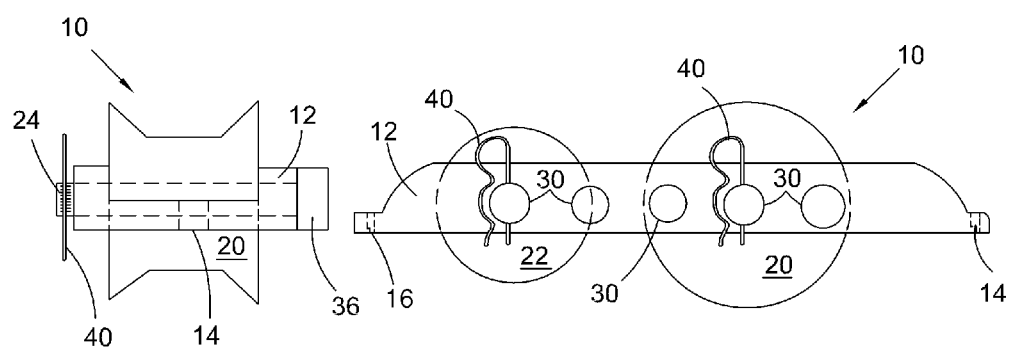
Figure 2:
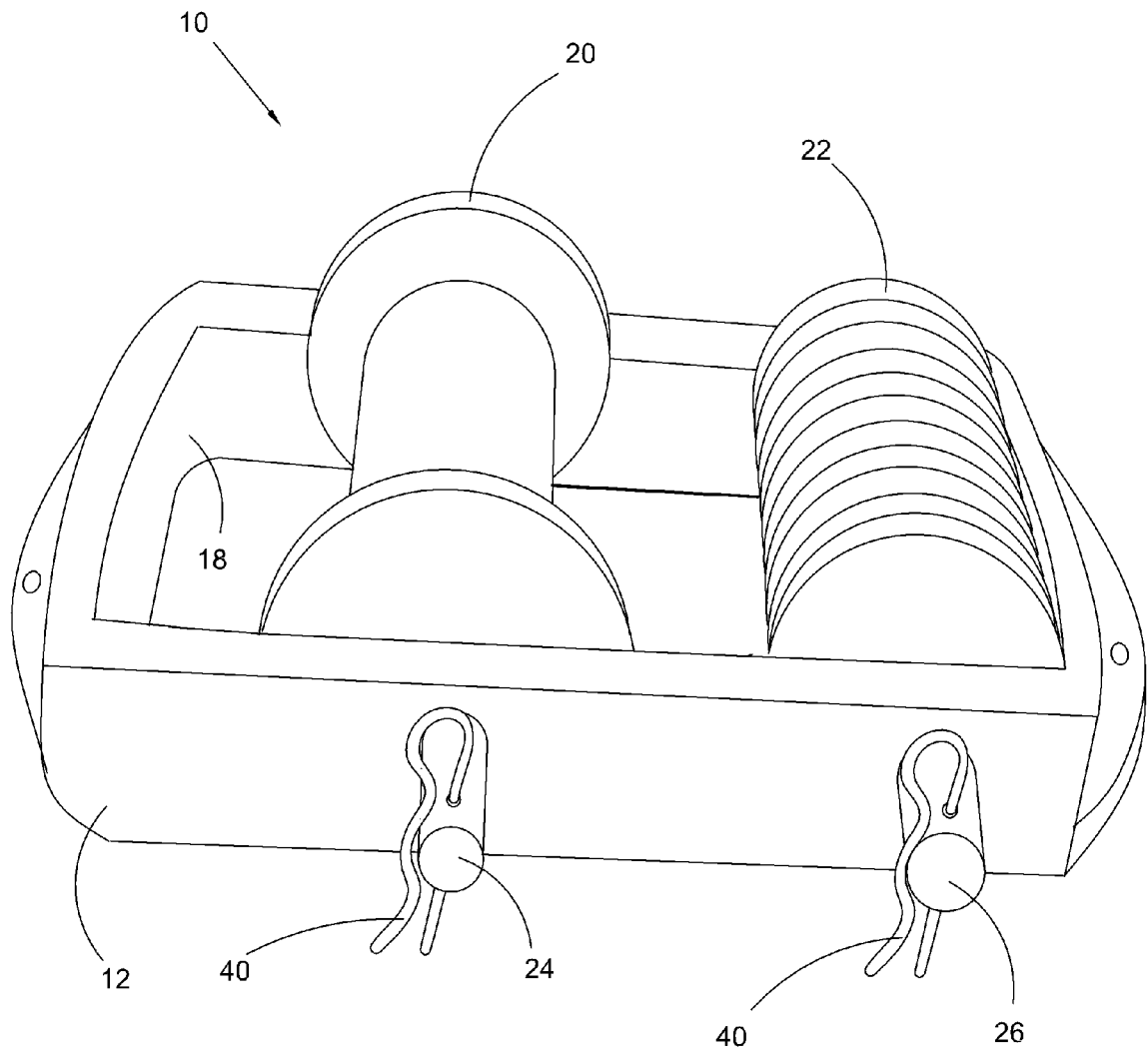
FIG. 2 is a perspective view of a device according to another embodiment of the invention.

As used herein, the term "wire" is meant to encompass wire, cable, string, and other materials (electrical, optical, or otherwise) which may be installed into conduit.

In FIGS. 1a-1c and 2, a device 10 according to an embodiment of the present invention is shown, wherein a frame 12 is adaptable to be attached to the access orifice of an LB fitting. The frame 12 may be made from metal or plastic. The frame 12 may contain two holes 14, 16, for attachment to the LB fitting using fasteners typically provided with such a fitting (fasteners are typically provided with each LB fitting in order to secure a cover over the access orifice). The frame 12 may be adapted for attachment to the LB fitting external to the fitting, within the fitting, or a combination of both.

The frame 12 contains a pass-through orifice 18 wherein a first roller 20 is mounted on a first axle 24 and a second roller 22 is mounted on a second axle 26. At least two holes 30, suitable for pass-through of the axles 24, 26, are disposed in the side rails 32, 34 of the frame 12. Either or both of the axles 24, 26 may be removable from the frame 12. In a non-limiting example, either or both of the axles 24, 26 may be headed on a head end 36 and may be have a removable retaining clip 40 on a clip end 38. The removable retaining clip 40 may be, for example, a cotter pin, an e-clip, a threaded bolt or other suitable device commonly known in the art. Other alternatives for removably attaching the axles 24, 26 to the frame 12 will be apparent to those having skill in the art.

The axles 24, 26 are mounted within the frame 12 by way of the holes 30. The device 10 may include a plurality of holes 30 such that the position of each roller 20, 22 may be adjusted relative to the frame 12. In this way, the appropriate roller position (by way of hole 30 selection) may be chosen according to the gauge of wire being pulled, size of LB device, or other criteria which will be readily apparent to those skilled in the art. The rollers 20, 22 may be manufactured from metal or plastic and may be straight sided as in roller 22, or concave as in roller 20.

Figure 3:
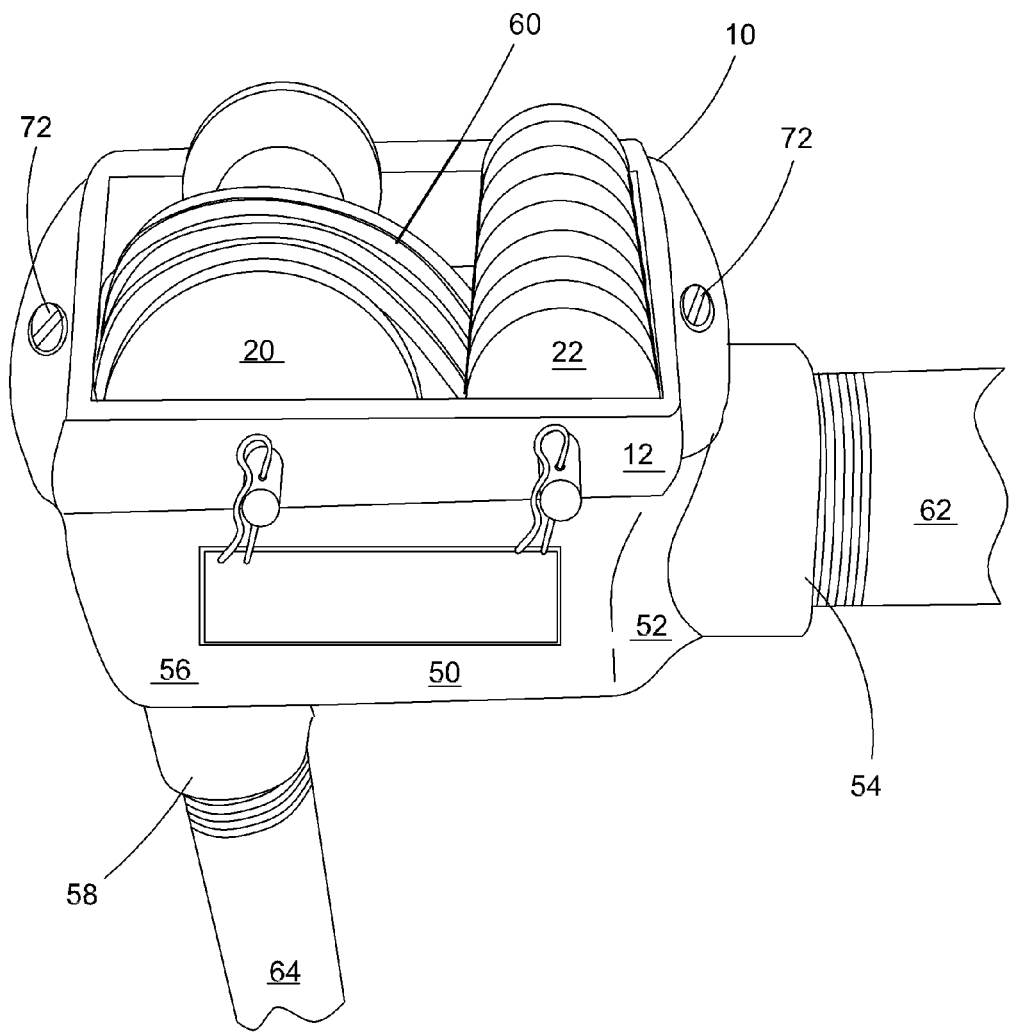
FIG. 3 is a perspective view of the device of FIG. 2, wherein the device is affixed to an LB fitting and corresponding conduit, and a plurality of wires is interlaced through the device.

FIG. 3 depicts the device 10 mounted to an LB fitting 50 with screws 72. The use of two rollers 20, 22 causes the wire 60 to be interlaced through the device 10 and necessitates the use at least one removable axle 24, 26. In this way, once the electrician has pulled wire to its desired position, one or both axles 24, 26 (and corresponding rollers 20, 22) may be removed and the frame 12 may be detached form the LB fitting 50. No portion of the device 10 need be left in or attached to the LB fitting 50.

Figure 4:
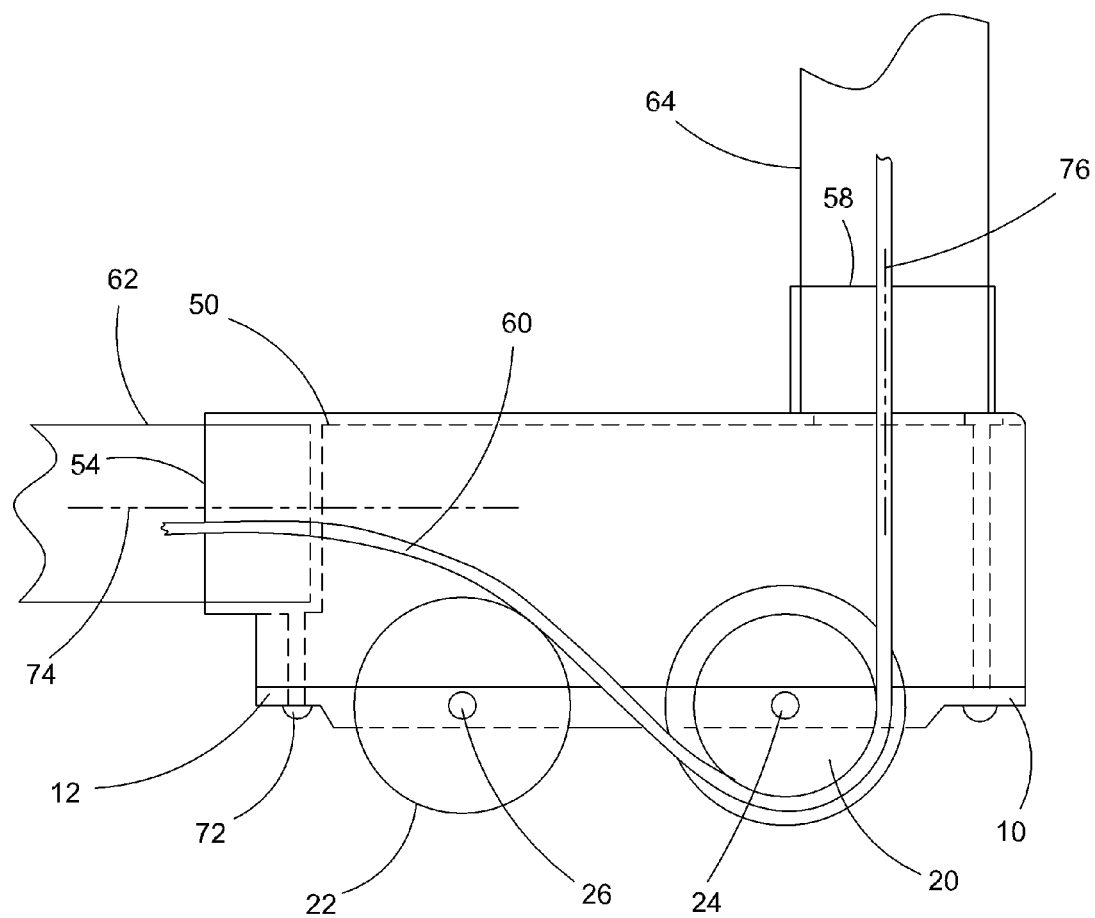
FIG. 4 is cross-sectional view of a device according to another embodiment of the invention.

The rollers 20, 22 may be the same size or differently sized according to a particular need. For example, second roller 22, which may be mounted on the entrance side 52 of the LB fitting 50 (see FIG. 3), may be sized such that a tangent of second roller 22 may position a wire 60 near the center of an entrance orifice 54 of the LB fitting 50 and parallel to the longitudinal axis 74 of a conduit pipe 62 connected to the entrance orifice 54. First roller 20, which may be mounted on the exit side 56 of the LB fitting 50, may be positioned along the length of the frame 12 such that a tangent of roller 20 may position wire 60 near the center of an exit orifice 58 of the LB fitting 50 and parallel to the longitudinal axis 76 of a conduit pipe 64 connected to the exit orifice 58 (see, e.g., FIG. 4).

The first roller 20 and/or the second roller 22 may be sized so as to avoid damage to a wire 60 being pulled. For example, optical fiber cable may have a minimum radius at which it may be bent to avoid breakage of the optical fiber. In such cases, the rollers 20, 22 may be selected in order to prevent an unacceptable amount of bending of the optical fiber cable being pulled.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention.

What is claimed is:

1. A device for guiding wire through an electrical fitting, comprising:
    a frame having two side rails, the frame being configured to removably attach to the electrical fitting;
    a first axle removably mounted to the frame between the side rails at a first position along the side rails and wherein the first axle is mounted to the frame such that the first axle is located outside of the electrical fitting when the frame is attached to the electrical fitting;
    a first roller rotatably mounted on the first axle between the side rails;
    a second axle mounted to the frame between the side rails at a second position along the side rails;
    a second roller rotatably mounted on the second axle between the side rails; and
    wherein the first axle further comprises an enlarged head on a first end and a retaining device on a second end.

2. The device of claim 1, wherein the frame is configured to be attached to the electrical fitting using fasteners.

3. The device of claim 2, wherein the fasteners are screws and wherein the screws are configured to engage screw holes in the electrical fitting.

4. The device of claim 1, wherein frame is configured to removably attach to an LB fitting.

5. The device of claim 1, wherein the second axle is removably mounted to the frame.

6. The device of claim 1, wherein the retaining device is selected from the group consisting of a clip or a threaded nut.

7. The device of claim 1, wherein the second axle further comprises an enlarged head on a first end and a retaining device on a second end.

8. The device of claim 1, wherein the first roller has a generally flat-sided cylindrical shape.

9. The device of claim 1, wherein the first roller has a generally concave cylindrical shape.

10. An coupler for electrical conduit having a removable device for guiding wire, comprising:
    an electrical fitting;
    a frame removably attached to the electrical fitting, the frame having two side rails;
    a first axle removably mounted to the frame between the side rails at a first position along the side rails and wherein the first axle is mounted to the frame such that the first axle is located outside of the electrical fitting when the frame is attached to the electrical fitting;
    a first roller rotatably mounted on the first axle between the side rails;
    a second axle mounted to the frame between the side rails at a second position along the side rails; and
    a second roller rotatably mounted on the second axle between the side rails.

11. The coupler of claim 10, wherein the frame is configured to be attached to the electrical fitting using fasteners.

12. The coupler of claim 11, wherein the fasteners are screws and wherein the screws are configured to engage screw holes in the electrical fitting.

13. The coupler of claim 10, wherein frame is configured to removably attach to an LB fitting.

14. The coupler of claim 10, wherein the second axle is removably mounted to the frame.

15. The coupler of claim 10, wherein the first axle further comprises an enlarged head on a first end and a retaining device on a second end.

16. The coupler of claim 15, wherein the retaining device is selected from the group consisting of a clip or a threaded nut.

17. The coupler of claim 15, wherein the second axle further comprises an enlarged head on a first end and a retaining device on a second end.

18. The coupler of claim 10, wherein the first roller has a generally flat-sided cylindrical shape.

19. The coupler of claim 10, wherein the first roller has a generally concave cylindrical shape.

* * * * *